United States Patent [19]

Quick

[11] 3,956,677

[45] May 11, 1976

[54] IGNITION TYPE CAPACITOR

[75] Inventor: Kenneth L. Quick, Oglesby, Ill.

[73] Assignee: Electrical Utilities Company, LaSalle, Ill.

[22] Filed: Dec. 17, 1974

[21] Appl. No.: 533,488

Related U.S. Application Data

[63] Continuation of Ser. No. 346,777, April 2, 1973, abandoned.

[52] U.S. Cl. ............................................... 317/260
[51] Int. Cl.² ......................................... H01G 1/14
[58] Field of Search ............................ 317/242, 260

[56] References Cited

UNITED STATES PATENTS

| 1,636,328 | 7/1927 | Sauer | 317/260 |
| 2,539,332 | 1/1951 | Schneider | 317/260 |
| 2,805,372 | 9/1957 | Schneider | 317/260 |
| 3,260,905 | 7/1966 | Rigazio | 317/260 |

FOREIGN PATENTS OR APPLICATIONS

| 120,065 | 11/1943 | Australia | 317/260 |
| 976,710 | 2/1964 | Germany | 317/260 |
| 465,180 | 5/1950 | Canada | 317/260 |

Primary Examiner—E. A. Goldberg
Attorney, Agent, or Firm—Hill, Gross, Simpson, Van Santen, Steadman, Chiara & Simpson

[57] ABSTRACT

A capacitor for magneto or ignition applications comprises an inwardly embossed X-configuration on the bottom of the shell for providing good electrical and mechanical contact with the adjacent exposed foil capacitor counterturns to in turn provide low series resistance and inductance and minimum rotational movement of the capacitor winding. At the other end of the shell, a terminal assembly is provided with an arcuate spring which electrically contacts the other exposed foil counterturns through the medium of a perforate contact washer. During assembly, the terminal assembly is forced toward the embossed bottom of the shell to preset the capacitor components by embedding the X-shaped embossment into the adjacent counterturns and to embed the opposite counterturns into the perforate contact washer. In this assembled configuration, electrical and mechanical contacts are ensured so that the effects of heat and vibration do not cause contact separation and arcing.

6 Claims, 7 Drawing Figures

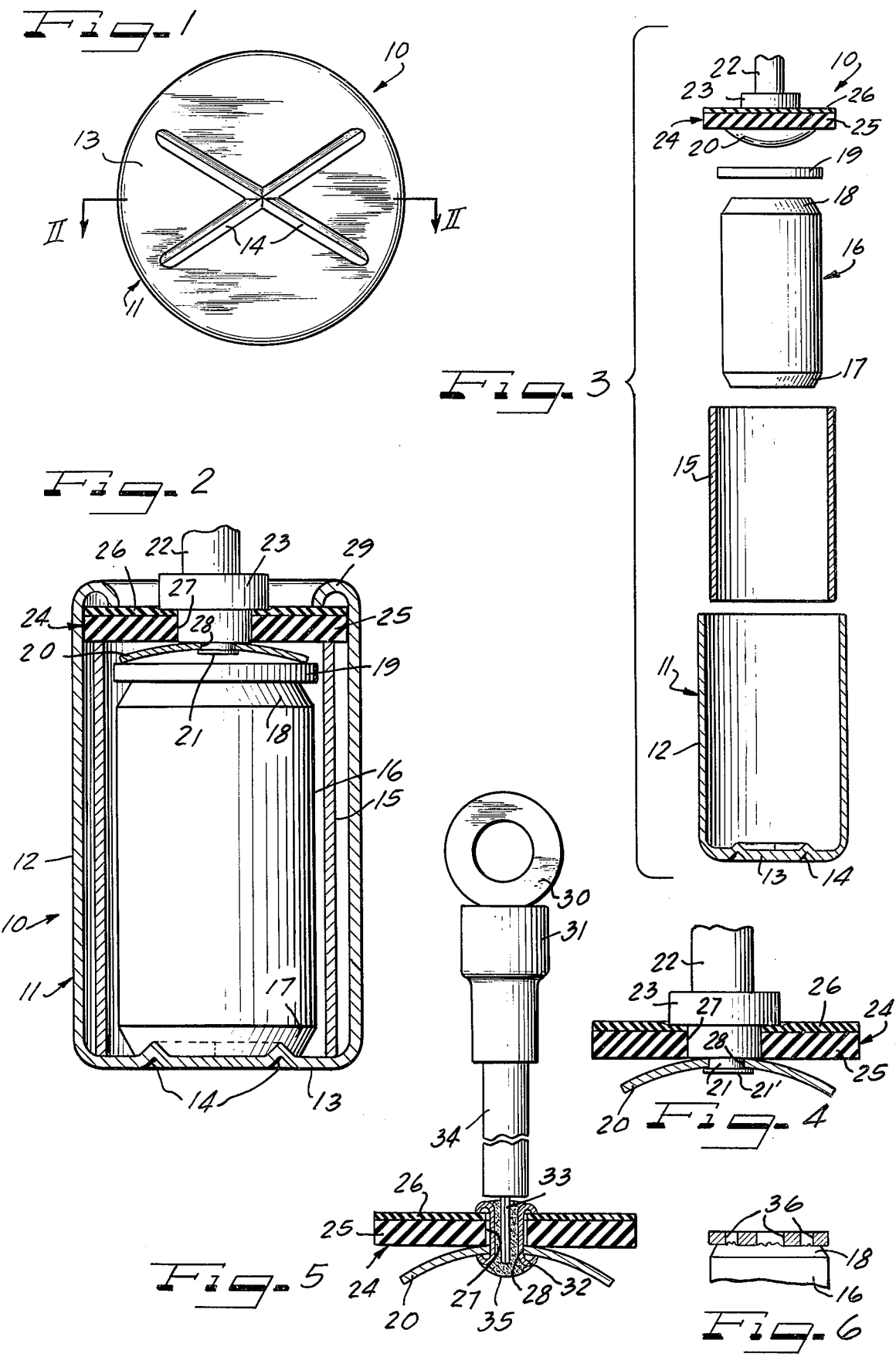

IGNITION TYPE CAPACITOR

This is a continuation of application Ser. No. 346,777, filed Apr. 2, 1973, now abandoned.

BACKGROUND OF THE INVENTION

1. Field of the Invention

This invention relates to capacitors, and is more particularly concerned with magneto or ignition capacitors which employ mechanical electrical contacts and are primarily used in high vibration and high heat environments. More specifically, the invention relates to the construction and methods of manufacture of such capacitors.

2. Description of the Prior Art

Magneto or ignition capacitor failure results when electrical arcing occurs due to the intermittent electrical connections within a mechanical contact capacitor construction. These intermittent connections become more evident as vibration and heat are increased.

One cause of intermittent electrical connections within the capacitor results when the operating equipment temperature exceeds the melting temperature of the solid wax winding impregnant, which, in turn, allows the winding to become soft and spongy. This soft winding in conjunction with equipment vibration and internal spring tension or pressure permits the remaining component parts to embed themselves into the soft winding, therefore eliminating any spring force on the package and allowing freedom of movement of the component parts in response to vibration. When the contact components separate arcing occurs and, as well known in the art, causes a rapid deterioration of the contacts and the internal component parts.

SUMMARY OF THE INVENTION

One object of this invention is to eliminate internal arcing of mechanical contacts in mechanical contact capacitor constructions.

Another object of the invention is to extend the useful operating range of the capacitor which is constructed with conventional components and materials.

Another object of the invention is to overcome the aforementioned arcing problem and provide a capacitor which may be employed under conditions of high vibration and heat.

To overcome the aforementioned problem, the present invention conditions or presets the conventional capacitor winding by crushing the extended or exposed foil ends to a predetermined volume during fabrication of the capacitor.

According to a feature of the invention, a curved washer type spring is securely fastened to each of the terminal assemblies regardless of whether the terminal assembly uses various stud configurations or a flexible lead wire. The positive attachment of the spring to the terminal assembly by staking or crimping maintains a positive mechanical and electrical connection which minimizes the series resistance. A perforate contact washer is sandwiched between the spring and one exposed end of the winding to maintain positive electrical contact with each counterturn of the winding which minimizes series resistance and series inductance. The perforations in the washer allow the exposed foil of the winding to protrude therethrough, therefore restricting any rotation or movement of the contact washer which would cause arcing.

In some previous capacitor designs, a spring makes direct contact with the exposed end of the winding, but does not contact every counterturn of the winding. Also, when the capacitor temperature is elevated sufficiently during operation to melt the wax impregnant, and since the bearing surface of the spring against the winding is small, the spring simply embeds itself into the soft winding and eliminates all spring tension necessary for a good mechanical contact.

Another feature of the present invention resides in the provision of two narrow embossed ground bars in the bottom of the case or shell of the capacitor. These embossed ground bars protrude inwardly and extend diametrically through the center of the bottom of the case or shell and are formed in an X-shape. The capacitor winding is embedded into the X-shaped ground bars during the sealing operation, thereby making positive contact with each counterturn of the winding to minimize series resistance and series inductance. The X-configuration of these ground bars also restricts any rotation or movement of the winding which would cause arcing. Heretofore, ground bars have been provided in a parallel configuration with respect to each other, such ground bars only making contact with a portion of the counterturns of the winding.

Another feature of the present invention resides in the design of the spring which has no compression limit in that it is non-destructible as far as the operational forces to be encountered. The spring enables all of the components to be embedded or preseated in place during the sealing operation. The sealing operation comprises the provision of a bakelite-rubber composition washer used in the terminal assembly for an end seal, pressing the washer toward the bottom of the shell embedding or pre-seating all of the components, and then crimping or turning the open end of the shell over and into the rubber portion of the composition washer to form a water-tight seal.

By pre-seating the components, minimum spring travel and positive contact are ensured when the capacitor is subjected to the high heat and high vibration encountered in the operation of a magneto or ignition system. In some previous capacitors, components could not be pre-seated, because the spring design was such that it would not take a compression set or break under the load necessary for pre-seating. The capacitors constructed in accordance with such design is not suitable for high heat and high vibration applications, because of the great amount of spring travel necessary to maintain positive contact due to the melting of the wax impregnant and the embedding of components into the winding.

BRIEF DESCRIPTION OF THE DRAWINGS

Other objects, features and advantages of the invention, its organization, construction and operation will more fully become apparent by reference to the following detailed description of a preferred embodiment of the invention taken in conjunction with the accompanying drawings, on which:

FIG. 1 is a bottom view of a capacitor constructed in accordance with the principles of the present invention, specifically illustrating the X-configuration of the embossed ground bar contacts;

FIG. 2 is an elevational cross sectional view of the capacitor of FIG. 1 taken substantially along the parting line II—II and showing the relative positions of each component of an assembled capacitor;

FIG. 3 is an exploded telescopic view of the capacitor illustrated in FIGS. 1 and 2, FIG. 3 showing the sequence of assembly;

FIG. 4 is a more detailed illustration of a typical stud terminal assembly constructed in accordance with the principles of the present invention;

FIG. 5 is a detailed view of a typical flexible lead wire terminal assembly constructed in accordance with the principles of the present invention;

FIG. 6 is a detailed sectional view of the perforate contact washer; and

DESCRIPTION OF THE PREFERRED EMBODIMENT

Figure 7:
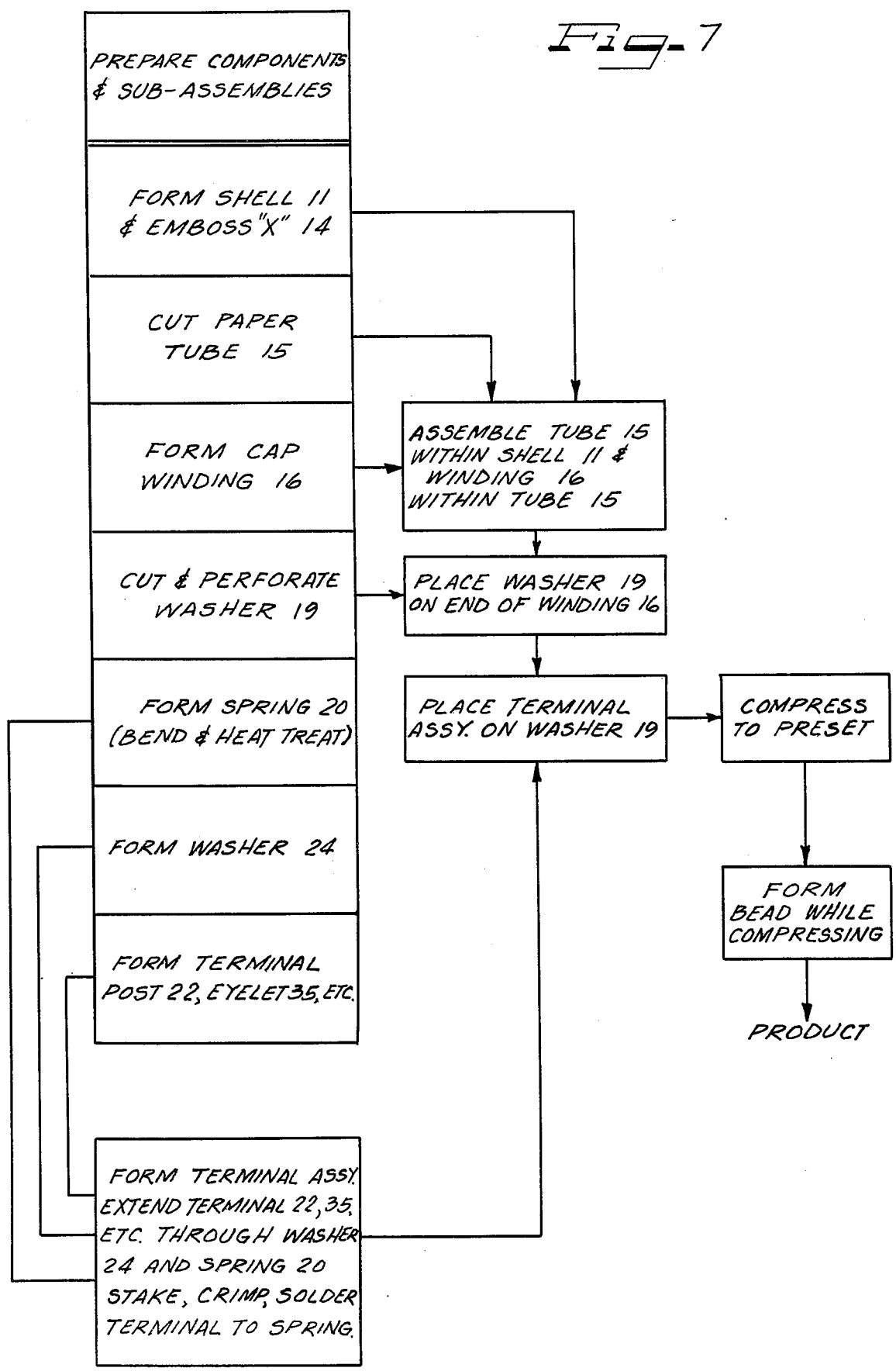
FIG. 7 is a flow chart describing the method of manufacture of a capacitor according to the invention.

Referring to FIGS. 1–3, a capacitor is generally illustrated at 10 as comprising a drawn or extruded cylindrical metal cylinder having a cylindrical sidewall 12, an open end, and a closed end or bottom 13, the metal cylinder forming a case over a shell for the capacitor, and also functioning as one electrical terminal of the capacitor, namely the ground terminal. The bottom 13 includes two inwardly embossed ground bars 14 extending diametrically across the bottom 13 in the form of an X-configuration. The ground bars 14, because of the X-shape, assure no winding movement and positive contact with each exposed foil counterturn 17 of a wound, wax impregnated capacitor winding 16, and provides an extremely low series resistance and series inductance.

A cylindrical paper tube 15 is disposed within the shell 11. The capacitor winding 16 is a conventional exposed foil winding including the bottom exposed counterfoil turns 17 and top exposed counterfoil turns 18. The paper tube 15 electrically insulates the exposed counterturns 18, a contact washer 19 and a arcuately curved washer-shaped spring or disc 20 from the shell 11, and further supports the perimeter of a composition washer 24 to maintain a degree of concentricity between the shell 11 and an electrical terminal stud 22.

The contact washer 19 is formed as a flat perforate metal washer which is embedded into the exposed foil counterturns 18 to provide the curved spring 20 a firm base on which to rest. The perforations 36 (FIG. 6) in the washer 19 allow portions of the exposed foil 18 to protrude therethrough, thereby locking the washer 19 in place. The washer 19 also makes positive electrical contact with each exposed foil counterturn 18 of the capacitor winding 16 resulting in extremely low series resistance and series inductance.

The composition washer 24 comprises, for example, a rubber portion 26 which is bonded to a bakelite portion 25. The washer 24 is employed in all of the terminal assemblies as a cover or end seal.

The curved washer spring or disc 20 is formed as a flat metal washer, and is then bent in the form of an arc or bow and heat treated to form a spring.

Referring to FIG. 4, the curved washer spring 20 is attached to a stud terminal assembly. The end of a stud terminal 22 extends through an aperture 27 in the composition washer 24 and has a shoulder 23 which abuts the rubber layer 26. The stud 22 includes an end 21 which extends through a central aperture 28 in the spring 20. The spring 20 and the composition washer 24 are pressed against the shoulder 23 to form a watertight seal between the shoulder 23 and the layer 26 and the end 21 of the stud 22 is then staked or crimped to extend diametrically beyond the aperture 28. Referring to FIG. 5, the curved washer spring 20 may also be attached to a wire terminal assembly by first clinching together the spring 20 and the composition washer 24 with a hollow rivet or eyelet 32. The electrical lead 34 carrying an eyelet terminal and an insulating sleeve 31 includes a portion 33 which is then inserted into the rivet or eyelet 32 and soldered therein at 35. The external lead 34 and the eyelet 30 and insulating sleeve 31 may, of course, be provided in a variety of sizes.

The nondestructible design of the spring 20 allows it to be flattened against the bakelite portion 25 of the composition washer 24 enabling the components to be embedded or pre-seated during the sealing or crimping operation which forms the bead 29 in FIG. 2.

When the components have all been assembled into the shell 11 as shown in the section view of FIG. 2 and the telescopic view of FIG. 3, the capacitor is pre-seated and sealed. This operation includes the embedding or pre-seating of the ground bars 14 into the exposed foil counterturns 17 of the winding 16, the embedding of the contact washer 19 into the exposed foil counterturns 18 of the capacitor winding 16, the flattening of the curve spring 20 against the bakelite portion 25 of the composition washer 24 and the top surface of the perforate contact washer 19, and the contemporaneous beading (29) of the open end of the shell 11 into the rubber portion 26 of the composition washer 24 while the terminal assembly is forced toward the bottom 13 of the shell 11.

The present invention provides for the manufacture of a capacitor using conventional materials, which capacitor is suitable for application in a magneto or ignition system environment where high heat and severe vibrations are encountered. Therefore, it is readily apparent from the foregoing that the objects of this invention have been completely fulfilled.

Although I have described my invention by reference to a particular illustrative embodiment thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A high temperature operating capacitor where the components are pre-seated comprising:
   a cup-shaped shell including a sidewall, an embossed bottom wall at one end, and an open other end;
   an electrically insulating tube within said shell having first and second ends, said first end contacting said bottom wall;
   a capacitor winding disposed within said tube and including first and second exposed metallic layers at opposite ends of said winding and having a dielectric comprising a solid wax impregnant, said first layers contacting said bottom wall;
   a perforated conductive disc independently carried on and electrically contacting said second metallic layers; and
   a terminal assembly including an electrically insulating washer carried within said shell and at said second end of said tube, an electrical lead extending through said washer, and an arcuate-shaped disc-like spring electrically connected to said lead and bearing against said washer and said spring having a continuous uninterrupted outer annular marginal edge with at least portions of the edge at opposite ends of the arc being engaged against said conductive disc which in turn engages each counter-turn of the winding and with the spring being in a pre-seated condition operating to continue to maintain the components under spring tension where the operating temperature of the equipment exceeds the melting temperature of the impregnant, said terminal assembly being an assembly independent of said disc and with said disc independently carried on said winding, said open end of said shell including a bead which together with said washer seals said shell with said spring urged against said conductive disc in said pre-seated condition.

2. A high temperature operating capacitor where the components are pre-seated comprising:
   a cup-shaped shell including a sidewall, a bottom wall at one end thereof, and an open other end, said bottom wall including an inwardly protruding embossment in the form of an "X";
   an electrically insulating tube within said shell having first and second ends, said first end contacting said bottom wall;
   a capacitor winding disposed within said tube and including first and second exposed metallic layers at opposite ends of said winding and having a dielectric, said first layers contacting said bottom wall with said embossment embedded in and contacting said first metallic layers, said embossment being of sufficient size and extent so as to be embedded against each counter-turn of the winding:
   a perforated conductive disc carried on and electrically contacting said second metallic layer and having edge means for mechanically locking engagement with said winding, said conductive discs including openings therethrough receiving portions of said second metallic layers; and
   a terminal assembly including an electrically insulating washer carried within said shell at second end of said tube, an electrical lead extending through said washer, and an arcuate-shaped disc-shaped spring connected to said lead and bearing against said washer and said arcuate shaped spring having a continuous uninterrupted annular outer marginal edge with at least opposed portions of the edge comprising opposite ends of the arc being engaged against said conductive disc which in turn engages each counter-turn of the winding and with the spring being in a pre-seated condition operating to continue to maintain the components under spring tension where the operating temperature of the equipment exceeds the melting temperature of the dielectric, said terminal assembly being an assembly independent of said disc and with said disc being independently carried on said winding, said open end of said shell including a bead which together with said washer seals said shell with said spring urged against said conductive disc in said pre-seated condition.

3. A capacitor according to claim 1, wherein said bottom wall of said shell includes an inwardly protruding embossment in the form of an "X" for embedding in and contacting said first metallic layers.

4. A capacitor according to claim 1, wherein said conductive disc includes openings therethrough for receiving portions of the associated electrical terminal of the capacitor winding.

5. A high temperature operating capacitor where the components are pre-seated comprising:
   a cup-shaped shell including a sidewall, an embossed bottom wall at one end, and an open other end;
   an electrically insulating tube within said shell having first and second ends, said first end contacting said bottom wall;
   a capacitor winding disposed within said tube and including first and second exposed metallic layers at opposite ends of said winding and having a dielectric comprising a solid wax impregnant, said first layers contacting said bottom wall;
   a perforated conductive disc carried on and electrically contacting said second metallic layers; and
   a terminal assembly including an electrically insulating washer carried within said shell and at said second end of said tube, an electrical lead extending through said washer, and an arcuate-shaped disc-like spring electrically connected to said lead and bearing against said washer and said spring having a continuous uninterrupted outer annular marginal edge with only limited opposed portions of the continuous annular edge in limited concentrated engagement against said conductive disc which in turn engages each counter-turn of the winding and with the spring being in a pre-seated condition operating to continue to maintain the components under spring tension where the operating temperature of the equipment exceeds the melting temperature of the impregnant, said terminal assembly being an assembly independent of said disc and with said disc being independently carried on said winding, said open end of said shell including means which together with said washer seals said shell with said spring urged against said conductive disc in said pre-seated condition.

6. A high temperature operating capacitor where the components are pre-seated comprising:
   a cup-shaped shell including a sidewall, an embossed bottom wall at one end, and an open other end;
   an electrically insulating tube within said shell having first and second ends, said first end contacting said bottom wall;
   a capacitor winding disposed within said tube and including first and second exposed metallic layers at opposite ends of said winding and having a dielectric comprising a solid wax impregnant, said first layers contacting said bottom wall;
   a perforated conductive disc carried on and electrically contacting said second metallic layers; and
   a terminal assembly including an electrically insulating washer carried within said shell and at said second end of said tube, an electrical lead extending through said washer, and an arcuate-shaped disc-like spring electrically connected to said lead and bearing against said washer and said spring having a continuous uninterrupted outer annular marginal edge with at least portions of the edge at opposite ends of the arcuate shape having an arcuate edge portions engaged directly against said perforated conductive disc which in turn engages each counter-turn of the winding and with the spring being in a pre-seated condition operating to continue to maintain the components under spring tension where the operating temperature of the equipment exceeds the melting temperature of the impregnant, said terminal assembly being an assembly independent of said disc and with said disc being independently carried on said winding, said open end of said shell including a bead which together with said washer seals said shell with said spring urged against said conductive disc in said pre-seated condition.

* * * * *